(No Model.) 3 Sheets—Sheet 1.

H. ESCHWEILER.
CAR BRAKE AND STARTER.

No. 544,888. Patented Aug. 20, 1895.

Witnesses:

Inventor
Henry Eschweiler (No Model.) 3 Sheets—Sheet 2.
H. ESCHWEILER.
CAR BRAKE AND STARTER.

No. 544,888. Patented Aug. 20, 1895.

Witnesses,

Inventor,
Henry Eschweiler
By Duruy & Co
Attys (No Model.) 3 Sheets—Sheet 3.

H. ESCHWEILER.
CAR BRAKE AND STARTER.

No. 544,888. Patented Aug. 20, 1895.

WITNESSES
Chapman Fowler.
Thomas W. Fowler.

INVENTOR
Henry Eschweiler,
by Dewey & Co
his Attorneys

UNITED STATES PATENT OFFICE.

HENRY ESCHWEILER, OF SAN FRANCISCO, CALIFORNIA, ASSIGNOR OF ONE-FOURTH TO EUGENE J. KELLER, OF SAME PLACE.

CAR BRAKE AND STARTER.

SPECIFICATION forming part of Letters Patent No. 544,888, dated August 20, 1895.

Application filed December 4, 1894. Serial No. 530,810. (No model.)

*To all whom it may concern:*

Be it known that I, HENRY ESCHWEILER, a subject of the Emperor of Germany, residing in the city and county of San Francisco, State of California, have invented an Improvement in a Car Brake and Starter; and I hereby declare the following to be a full, clear, and exact description of the same.

My invention relates to a device which is adapted to act as a brake in stopping cars, and in so doing to store up power which may afterward be applied to assist in starting the car.

It consists in certain details of construction, which will be more fully explained by reference to the accompanying drawings, in which—

Figure 1:
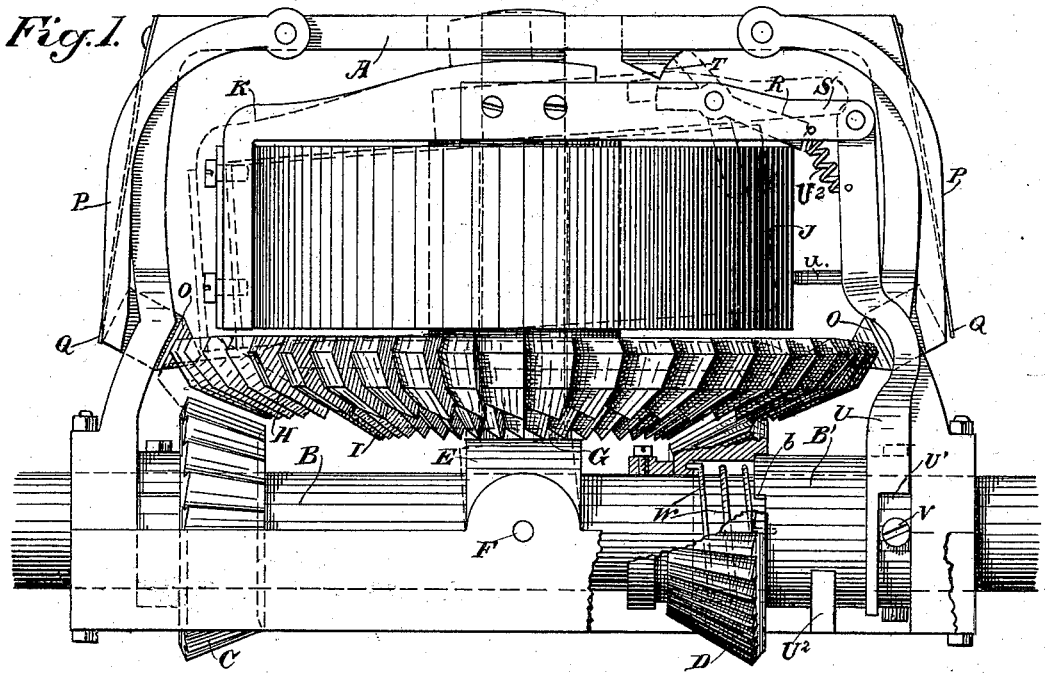
Figure 2:
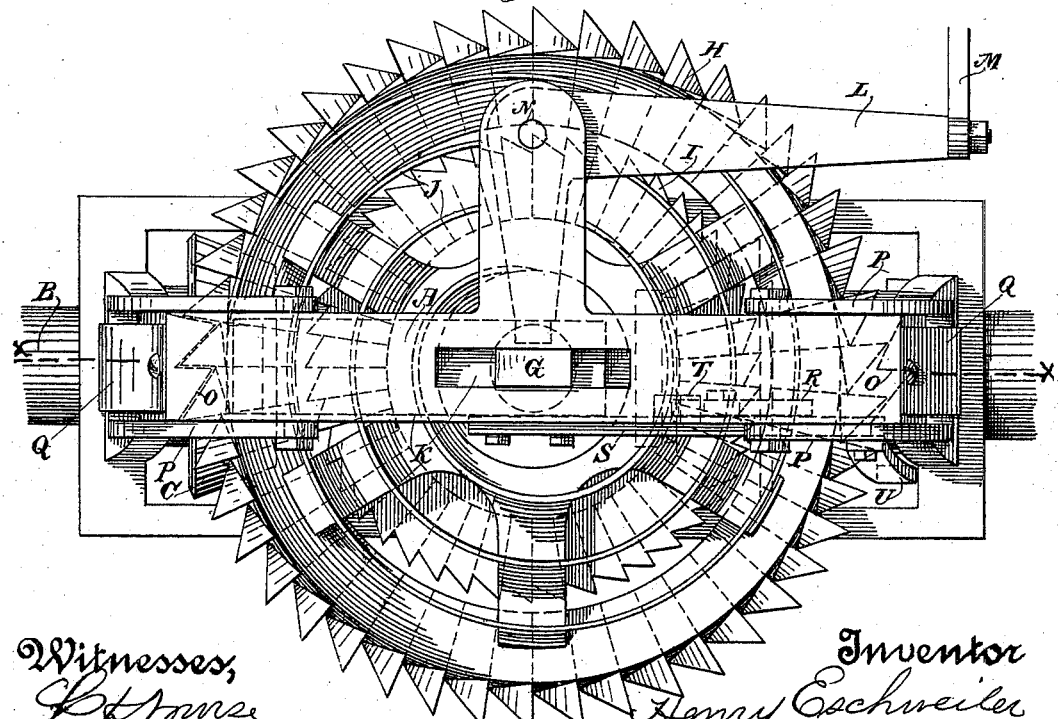
Figure 3:
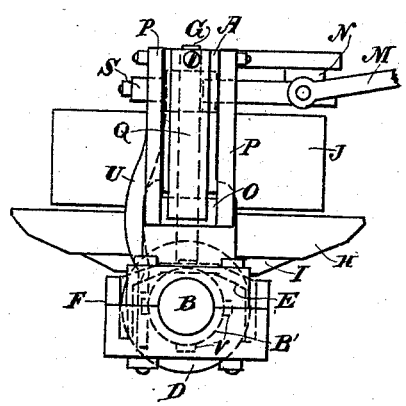
Figure 3:
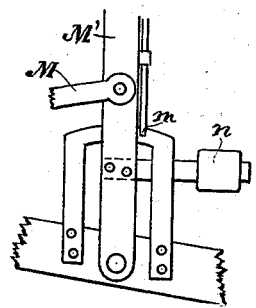
Figure 4:
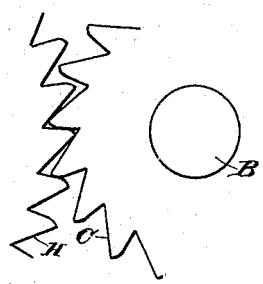
Figure 5:
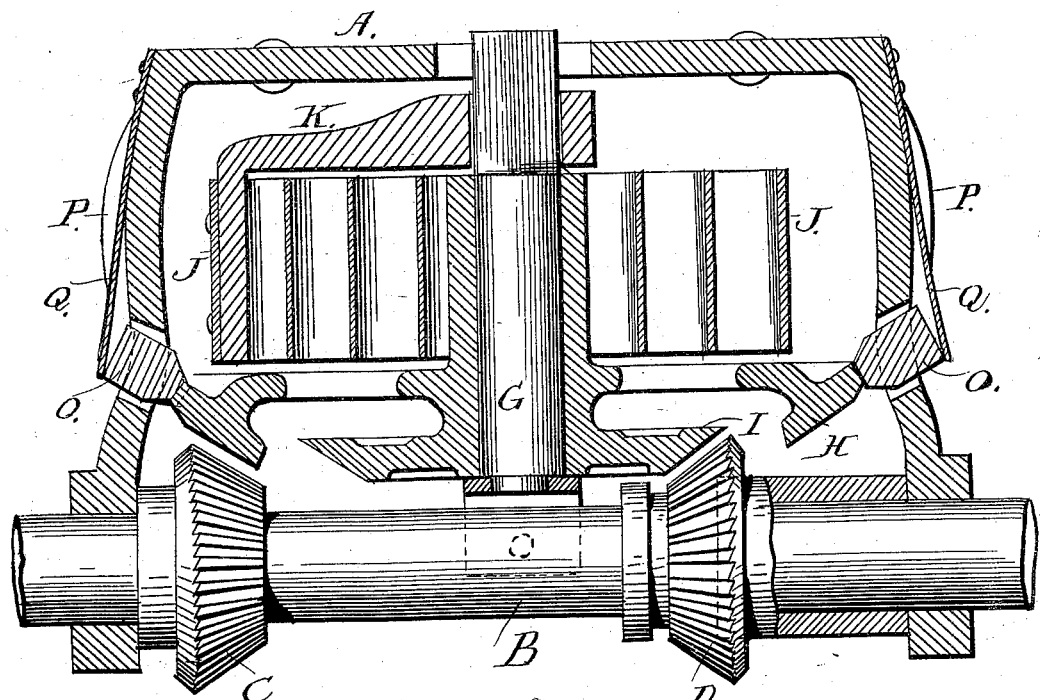

Figure 1 is a side elevation of the apparatus, a part of one pinion being broken away. Fig. 2 is a plan view. Fig. 3 is an end view showing its connection with the operating hand-lever. Fig. 4 shows the construction of the teeth. Fig. 5 is a longitudinal sectional view on the line *x x* of Fig. 2, showing the axle or shaft and its pinions in elevation.

A is a framework of any suitable construction upon which the apparatus is mounted and supported.

B represents the shaft or axle, having upon it two pinions C and D.

E is a yoke arching above the shaft B and extending transversely across the frame, having its ends pivoted in the sides of the frame, as shown at F, so that this yoke may have a rocking motion about its pivot-pins, which are in line transversely with the axis of the shaft B. From the top of the yoke a shaft G extends upwardly, and upon it turn in unison the bevel gear-wheels H and I. The upper end of the shaft G is flattened and extends through a slot in the top of the frame A, being movable from one end of the slot to the other, so that the shaft and yoke, turning about the fulcrum-pins F of the latter, will tilt the bevel-gears to one side or the other. When tilted to one side, the larger gear H engages with the pinion C, which is fixed upon the shaft or axle B at such a point that the gear will engage with it. When tilted in the opposite direction, the inner and smaller gear I will engage with the pinion D, the position of which on the shaft B is such as to allow of such an engagement, and when either of the gears is engaged with its pinion the other one will be disengaged from its pinion. When the shaft G stands vertically, the gears H and I will be clear of the pinions C and D.

J is a powerful coil-spring, the outer end of which is fixed to an arm K, which in turn is bolted to the shaft G, so as to oscillate with it. The spring J is coiled around the shaft and has its inner end fixed to the hub of the gears H and I, which extends up within the spring sufficiently for this purpose.

In the drawings I have only shown three turns of the spring, to prevent confusion of the parts; but it will be understood that as many turns may be employed as may be necessary for the purpose. I have found that seven or eight turns are very satisfactory in the apparatus which I have tried.

L is a bell-crank lever, the handle of which is fulcrumed, as shown at N, to the arm which projects from the upper part of the frame A. The inner end of this lever engages an arm K, which is fixed to the shaft G, and the outer end is correspondingly engaged by a rod M, which extends to a point where it connects with the hand-lever M' within reach of the motorman or gripman of the car.

The operation of this part of the device will then be as follows: The car being in motion, and the gears H and I being both disengaged from the pinions upon the car-axle, if it is desired to stop the car the lever is moved so as to tilt the shaft G and the gears until the gear H engages with the gear C upon the car-axle. The motion of the car-axle is then transmitted to the gear H and the hub is rotated so as to coil the spring J, and the increasing tension of the spring as it is coiled gradually brings the car to a state of rest. When the car is stopped upon approximately level ground, the operating-lever is returned to a central position and the gear H is disengaged from both the pinions C and D. If the car is stopped on an upgrade, the lever is thrown over until the gear engages the pinion D, in which position it assists in preventing the car from running back. When the car is stopped on a downgrade, the gear H remains in engagement with the pinion C and then acts as a lock to prevent the car from starting before it is desired. When it is desired to start the car, the lever is moved and the shaft G is tilted so that the gear H is disengaged from the pinion C and the smaller gear I is thrown into engagement with the pinion D. The effort of the spring to uncoil itself is communicated, through the smaller gear I, to the pinion D upon the car-axle with a power which is increased in proportion as this gear is smaller than the gear H by which the spring was originally coiled, and the car will thus be started, after which the ordinary power which is applied to move it will continue its motion. As the gears H and I are temporarily disengaged from the gears C and D when the shaft is being tilted from one side to the other, it is necessary to lock them while this transfer is being made, so as to prevent the spring from uncoiling suddenly without applying its power. The means adopted for this purpose consist of stop-pawls O, connected with spring-actuated swinging arms P, which are fulcrumed to the frame A, as shown, and extend down along the sides of the frame to points where the frame is slotted so that the pawls O pass through the slots, and when the gears H and I are disengaged from the pinions C or D these pawls engage the teeth of the gears H and thus prevent its rotating. The pawls are so arranged with reference to the teeth of the gear that the latter will only turn half the space between the teeth before one or the other pawl will be engaged, and this prevents the slight jar possible if the gear could slip the whole distance between two teeth. The pawls are tapered or pointed, as shown, so that when the gears are tilted far enough in either direction to engage their corresponding pinions on the axle, that side of the gear H which is tilted downward will pass below its pawl O, and the side correspondingly tilted upward will pass above the point of the opposite pawl, thus leaving the gear free to turn after it has become engaged with the pinion C or D upon either side, but preventing any rotation while it stands intermediately between them, and with the shaft G in an essentially-vertical position. Springs Q press upon the arms P, so as to insure the engagement of the pawls O with the gear H, but they yield, so that in case the point of any of the teeth of the gear H are in line with the pawl during the tilting of the gear the pawl will yield sufficiently to allow the gear to tilt, but will be in position to drop between the teeth as soon as the gear is moved sufficiently for that purpose. The normal position of the shaft G is essentially vertical with the gears H and I out of engagement with their pinions C and D, and this position is maintained by a spring-catch m upon the operating hand-lever M', which retains the parts in this position after the gear H has been disengaged from the pinions C and D.

n is a weight fixed to an arm projecting from one side of the lever M', and this acts to hold the gear I in engagement with the pinion D until the bar U acts to disengage it.

In order to prevent the tilting of the gears so that the gear H will engage the pinion C when the spring J is partially coiled, I have shown a locking device which consists of a lever-arm R, fulcrumed to an arm S, which is secured to and tilts with the shaft G. The outer end of this arm rests upon the outer periphery of the coil of the spring J when the latter is fully uncoiled, and its inner and shorter arm stands approximately horizontal and below the upper line of the arm S. When the spring J is coiled up, it becomes smaller in diameter by reason of the coiling, and the outer end of the arm R, resting upon it, follows it inwardly as it coils, thus tilting the opposite arm upward. When thus tilted upward above the top of the arm S, the outer end of the lever R is brought into line with a stop T, which is fixed upon the frame A, and while in this position it acts to prevent any tilting of the gears, so as to engage the gear H with the pinion C. This lock will always remain in effect while the spring is coiled up, but whenever the device has been tilted in the opposite direction, so as to apply the power of the spring to start the car, and when the spring has become uncoiled, it will again move the lever-arm R so that it assumes its normal position out of engagement with the stop T, and while it is in this position it offers no obstruction to the tilting of the device to engage the gears H and C and again coil the spring.

U is an arm pivoted to the end of the arm S and hanging down therefrom. The lower end of this arm has an offset or shoulder U', which may be brought into line with a projecting lug or pin V, fixed to the shaft or axle, but it is ordinarily withdrawn and out of line either because the bar U, hanging pendent, will carry the shoulder U' out of the line of the lug V, or it may be held away by a light spring. When the spring J is uncoiled as far as it is desired it enlarges, so that its outer periphery will strike the projection u of the bar U and, pushing it outwardly, will cause the offset U' to come into line with the lug V, and the bar U will then be pushed up by the lug V as the shaft rotates, and acting upon the arm S, which is fixed to the shaft G, will tilt the apparatus until the gear is disengaged from the pinion and the shaft G has returned to a vertical position, where it is latched, and the gear is out of engagement with both pinions. The gears are only tilted toward the lug V when the spring J is wound up and ready to operate the pinion D. At that time the arm U is held away from the lug by means of a spring $U^2$, connected with the upper end of the arm, as shown in Fig. 1.

$U^2$ is a stop fixed to the frame at a point where it will arrest the arm U and prevent its striking the gear H when it swings toward it.

The pinion D turns loosely upon the axle B between suitable collars which retain it in its position. One of these collars B' has a lug b, which projects into a corresponding slot or channel made in the end of the pinion D, and this slot or channel is of sufficient length to allow the pinion to turn a short distance in each direction before the end of the channel will strike the lug. A coiled spring W has one end fixed to the pinion and the other to the sleeve or collar B', and this spring normally holds the pinion in such position as to bring the lug b against the front end of the channel and in position to apply the power to start the pinion and axle; but as the teeth of the gear and pinion may not always exactly coincide when this tilting takes place, it is necessary to allow the pinion to yield a little, so that the engagement may take place without damaging the teeth. The spring W, by yielding when the teeth do not come properly in contact, will allow them to slip backward over each other until they properly engage, and then the end of the slot in the pinion will bring up against the lug b, so as to transmit the power applied to the pinion to the axle. The gear-teeth are also preferably slightly curved on the front and beveled on the back, so that they will more readily engage.

Having thus described my invention, what I claim as new, and desire to secure by Letters Patent, is—

1. A car brake and starter consisting of a spring adapted to coil about the hub of a gear or gears which are fulcrumed to stand essentially at right angles with the car axle, a mechanism by which the gears may be tilted to one side or the other, pinions fixed upon the car axle so that one of said pinions is engaged when the gears are tilted to one side, and the spring will be coiled thereby, and the other pinion is engaged when the gear is tilted in the opposite direction so that the spring in the act of uncoiling will apply its power to rotate the axle and start the car.

2. A car brake and starting device consisting of a gear or gears mounted upon a shaft standing approximately at right angles with the car axle and adapted to tilt about a fulcrum in line with the center of said axle, a pinion fixed to the axle adapted to be engaged by the gear when tilted to one side so that the rotation of the axle will turn the gear, a coiled spring having one end fixed to the hub of the gear, and the other to a stationary point and adapted to be coiled by this engagement of the gear and pinion a second pinion fixed to the car axle upon the opposite side of the gear shaft adapted to be engaged by the gear when tilted to that side whereby the tension of the coiled spring will be applied to the pinion to start the car, and stops or pawls adapted to engage the gear and prevent its rotation while it is being tilted from one side to the other, and while it is out of engagement with either of the gears.

3. A car brake and starter consisting of pinions fixed to the car axle, a gear wheel having a shaft projecting approximately at right angles from the axle and adapted to tilt about fulcrum pins in line with the center of the axle whereby one side may be engaged with one of the pinions to rotate the gear in one direction, a coiled spring fixed upon the hub of the gear so as to be coiled up by the power applied through the pinion of the gear, and to apply its power to the second pinion by uncoiling when the gear is tilted in the opposite direction so as to turn the car axle after it has been stopped, swinging spring-actuated arms having pawls projecting from them adapted to engage the teeth of the gear when the shaft of the latter is essentially at right angles with the car axle, and the gear disengaged from both pinions whereby the gear is prevented from being turned while thus disengaged.

4. A car brake and starter consisting of a tilting gear having a coiled spring fixed to its hub, pinions upon the car axle, with one of which the gear is engaged by tilting in one direction so as to coil the spring, and with the other of which it is engaged when tilted in the opposite direction so that the power of the coiled spring is applied to turn the axle, a bell crank lever fulcrumed to the frame having one arm connecting with the tilting shaft of the gear and the other with an operating lever whereby the gear may be tilted to either side.

5. In a car brake and starter, a tilting gear having a coiled spring connected with its hub, pinions upon the car axle with one of which the gear engages when tilted to one side so as to coil the spring, and with the other of which it engages when tilted to the other side so that the uncoiling of the spring will apply power to rotate the axle, a mechanism to prevent the device from being tilted to engage the coiling pinion when the spring is already fully coiled, consisting of a lever R fulcrumed so that its outer end rests upon the periphery of the spring, and a stop T with which its inner end engages when the spring is coiled to prevent the tilting of the gears.

6. In a car brake and starter, a tilting gear or gears, a spring adapted to coil about the hub of the gear, pinions fixed upon the car axle, one of which is engaged by the gear when tilted in one direction to coil the spring, and the other is engaged when the gear is tilted in the opposite direction so that the uncoiling of the spring will apply power to turn the axle, a means for preventing the uncoiling of the spring beyond the proper point, consisting of the depending swinging arm U having an offset U', and a lug V fixed upon the car axle so as to be engaged by the offset when the spring has uncoiled sufficiently to force the arm U outwardly to bring an offset into line with the lug.

7. In a car brake and starter, a tilting gear having a spring adapted to coil and uncoil about its hub, pinions upon the car axle, one of which is engaged by the gear when tilted to one side whereby the spring is coiled and the other is engaged by the gears when tilted to the opposite side whereby the power developed by the uncoiling of the spring is applied through said pinion to the axle, said pinion turning loosely upon the axle having a channel and stop whereby it may turn a short distance to allow the teeth of the gear and pinion to adjust and engage themselves, and a spiral spring connection with the pinion and the axle to hold the lug against the end of the slot or channel, in position to start, and adapted to yield to allow of the adjustment of the teeth of the gears to each other.

8. A car brake and starter consisting of a tilting gear having a coiled spring fixed to its hub, pinions upon the car axle, with one of which the gear is engaged by tilting in one direction so as to coil the spring, and with the other of which it is engaged when tilted in the opposite direction so that the power of the coiled spring is applied to turn the axle, a lever fulcrumed to the frame and connected with the tilting gears and with an operating lever, a catch by which the lever is locked in a central position, and a weight or spring by which the gear is retained in engagement with the starting pinion as described.

In witness whereof I have hereunto set my hand.

HENRY ESCHWEILER.

Witnesses:
S. H. NOURSE,
H. F. ASCHECK.